United States Patent
Dutta et al.

(10) Patent No.: US 10,655,477 B2
(45) Date of Patent: May 19, 2020

(54) TURBINE COMPONENTS AND METHOD FOR FORMING TURBINE COMPONENTS

(71) Applicant: GENERAL ELECTRIC COMPANY, Schenectady, NY (US)

(72) Inventors: Sandip Dutta, Greenville, SC (US); Benjamin Paul Lacy, Greer, SC (US); Gary Michael Itzel, Simpsonville, SC (US); Joseph Anthony Weber, Simpsonville, SC (US); David Edward Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 738 days.

(21) Appl. No.: 15/219,804

(22) Filed: Jul. 26, 2016

(65) Prior Publication Data
US 2018/0030837 A1 Feb. 1, 2018

(51) Int. Cl.
*F01D 5/18* (2006.01)
*B22F 5/04* (2006.01)
(Continued)

(52) U.S. Cl.
CPC .............. *F01D 5/189* (2013.01); *B22F 5/04* (2013.01); *B33Y 80/00* (2014.12); *F01D 9/041* (2013.01);
(Continued)

(58) Field of Classification Search
None
See application file for complete search history.

(56) References Cited

U.S. PATENT DOCUMENTS 3,930,748 A * 1/1976 Redman ................. F01D 5/189
416/97 R
4,252,501 A 2/1981 Peill
(Continued)

FOREIGN PATENT DOCUMENTS

EP 0182588 B1 9/1988
EP 2607624 A1 * 6/2013 ............. F01D 5/147
(Continued)

OTHER PUBLICATIONS

Sheet Metal Design, Mechanical Tolerances and Overview, Engineers Edge, http://www.engineersedge.com/sheet_metal.htm, Retrieved Jan. 25, 2016.
(Continued)

*Primary Examiner* — Igor Kershteyn
*Assistant Examiner* — Jason G Davis
(74) *Attorney, Agent, or Firm* — McNees Wallace & Nurick LLC

(57) ABSTRACT

Turbine components are disclosed including a component wall defining a constrained portion, a manifold having an impingement wall, and a post-impingement cavity disposed between the manifold and the component wall. The impingement wall includes a wall thickness and defines a plenum and a tapered portion. The tapered portion tapers toward the constrained portion and includes a plurality of impingement apertures and a wall inflection. The wall inflection is disposed proximal to the constrained portion, and the tapered portion is integrally formed as a single, continuous object. The wall inflection may include an inflection radius of less than about 3 times the wall thickness of the impingement wall, or the tapered portion may include a consolidated portion with the impingement wall extending across the plenum. A method for forming the turbine component is also disclosed, including forming the tapered portion as a single, (Continued)

continuous tapered portion by an additive manufacturing technique.

20 Claims, 4 Drawing Sheets

(51) Int. Cl.
    *B33Y 80/00*         (2015.01)
    *F01D 9/04*          (2006.01)
    *F01D 25/12*        (2006.01)
    *B22F 3/105*       (2006.01)

(52) U.S. Cl.
CPC ............ *F01D 25/12* (2013.01); *B22F 3/1055* (2013.01); *F05D 2230/22* (2013.01); *F05D 2230/232* (2013.01); *F05D 2230/30* (2013.01); *F05D 2240/128* (2013.01); *F05D 2240/30* (2013.01); *F05D 2250/292* (2013.01); *F05D 2260/201* (2013.01); *F05D 2260/202* (2013.01); *F05D 2300/171* (2013.01); *Y02P 10/295* (2015.11)

(56) References Cited

U.S. PATENT DOCUMENTS

| | | |
|---|---|---|
| 5,328,331 A | 7/1994 | Bunker et al. |
| 5,516,260 A * | 5/1996 | Damlis ................ F01D 5/189 |
| | | 415/115 |
| 6,464,456 B2 | 10/2002 | Darolia et al. |
| 6,742,991 B2 | 6/2004 | Soechting et al. |
| 7,121,796 B2 | 10/2006 | Burdgick et al. |
| 8,096,768 B1 | 1/2012 | Liang |
| 8,662,844 B2 | 3/2014 | Hada et al. |
| 8,734,108 B1 | 5/2014 | Liang |
| 8,777,569 B1 | 7/2014 | Liang |
| 9,039,371 B2 | 5/2015 | Lee et al. |
| 9,174,312 B2 * | 11/2015 | Baughman ............ B23K 1/0018 |
| 9,650,899 B2 * | 5/2017 | Mugglestone .......... F01D 5/189 |
| 2005/0042075 A1 * | 2/2005 | Yang ...................... F01D 5/189 |
| | | 415/115 |
| 2012/0177478 A1 | 7/2012 | Giri et al. |
| 2013/0156549 A1 | 6/2013 | Maldonado |
| 2014/0193270 A1 * | 7/2014 | Plunkett ............. B29D 99/0025 |
| | | 416/241 R |
| 2015/0016973 A1 | 1/2015 | Mugglestone |

FOREIGN PATENT DOCUMENTS

| | | |
|---|---|---|
| EP | 2607624 B1 | 12/2014 |
| EP | 3 141 699 A1 | 3/2017 |
| GB | 2084262 A | 4/1982 |

OTHER PUBLICATIONS

Extended European Search Report and Opinion issued in connection with corresponding EP Application No. 17182731.4 dated Jan. 22, 2018.

* cited by examiner

TURBINE COMPONENTS AND METHOD FOR FORMING TURBINE COMPONENTS

FIELD OF THE INVENTION

The present invention is directed to turbine components and methods for forming turbine components. More particularly, the present invention is directed to turbine components having reduced enervated zones and methods for forming the turbine components including reduced enervated zones.

BACKGROUND OF THE INVENTION

Gas turbine components such as nozzles are subjected to intense heat and external pressures in the hot gas path. These rigorous operating conditions are exacerbated by advances in the technology, which may include both increased operating temperatures and greater hot gas path pressures. As a result, components such as nozzles are sometimes cooled by flowing a fluid through a manifold inserted into the core of the nozzle, which exits the manifold through impingement holes into a post-impingement cavity, and which then exits the post-impingement cavity through apertures in the exterior wall of the nozzle, forming a film layer of the fluid on the exterior of the nozzle.

The materials from which turbine components such as nozzles are formed, combined with the particular conformations which the turbine components include, lead to certain inhibitions in the cooling efficacy of the cooling fluid systems. With respect to nozzles, by way of example, the external surface of the nozzle may include a sharply narrowing conformation, which the manifold must follow. However, the narrowing conformation of the nozzle and the structural limitations of the materials used to form the manifold inserted into the nozzle may lead to the formation of an enervated zone in the portion of the post-impingement cavity closest to the trailing edge of the nozzle. The material of the manifold can only be turned to a particular degree of bend radius without compromising the structure integrity of the manifold, which limits how far along the narrowing nozzle the manifold can project, and thereby limits how close impingement holes can be positioned into the most tapered portion of the nozzle. The lack of impingement holes in this enervated region decreases the cooling effect of the cooling fluid, as the cooling fluid will circulate less in the enervated zone. The presence of this enervated zone either requires excess cooling fluid to be employed, reducing overall efficiency of the turbine, or limits the temperature at which the turbine can operate, also reducing overall efficiency of the turbine.

BRIEF DESCRIPTION OF THE INVENTION

In an exemplary embodiment, a turbine component includes a component wall, a manifold disposed within the component wall, and a post-impingement cavity disposed between the manifold and the component wall. The component wall includes a plurality of external apertures and defines a constrained portion. The manifold includes an impingement wall, and the impingement wall includes a wall thickness and defines a plenum and a tapered portion. The tapered portion tapers toward the constrained portion and includes a plurality of impingement apertures and a wall inflection. The wall inflection is disposed proximal to the constrained portion. The post-impingement cavity is arranged to receive a fluid from the plenum through the plurality of impingement apertures and exhaust the fluid through the plurality of external apertures, and includes an enervated zone disposed between the tapered portion and the constrained portion. The tapered portion is integrally formed as a single, continuous object, and the wall inflection includes an inflection radius measured on the inside of the wall inflection of less than about 3 times the wall thickness of the impingement wall at the wall inflection.

In another exemplary embodiment, a turbine component includes a component wall, a manifold disposed within the component wall, and a post-impingement cavity disposed between the manifold and the component wall. The component wall includes a plurality of external apertures and defines a constrained portion. The manifold includes an impingement wall, and the impingement wall includes a wall thickness and defines a plenum and a tapered portion. The tapered portion tapers toward the constrained portion and includes a wall inflection disposed proximal to the constrained portion. The tapered portion further includes a consolidated portion in which the impingement wall extends across the plenum between the plenum and the wall inflection. The consolidated portion includes a plurality of impingement apertures. The post-impingement cavity is arranged to receive a fluid from the plenum through the plurality of impingement apertures and exhaust the fluid through the plurality of external apertures. The post-impingement cavity includes an enervated zone disposed between the tapered portion and the constrained portion. The tapered portion is integrally formed as a single, continuous object.

In another exemplary embodiment, a method for forming a turbine component includes integrally forming a single, continuous tapered portion of an impingement wall by an additive manufacturing technique, incorporating the impingement wall into a manifold, and disposing the impingement wall within a component wall. The impingement wall includes a wall thickness and defines a plenum. The tapered portion tapers to a wall inflection and includes a plurality of impingement apertures. The component wall includes a plurality of external apertures and defines a constrained portion. The wall inflection is disposed proximal to the constrained portion. Disposing the impingement wall within the component wall defines a post-impingement cavity between the manifold and the component wall. The post-impingement cavity is arranged to receive a fluid from the plenum through the plurality of impingement apertures and exhaust the fluid through the plurality of external apertures. The post-impingement cavity includes an enervated zone disposed between the tapered portion and the constrained portion.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figures 1, 2:
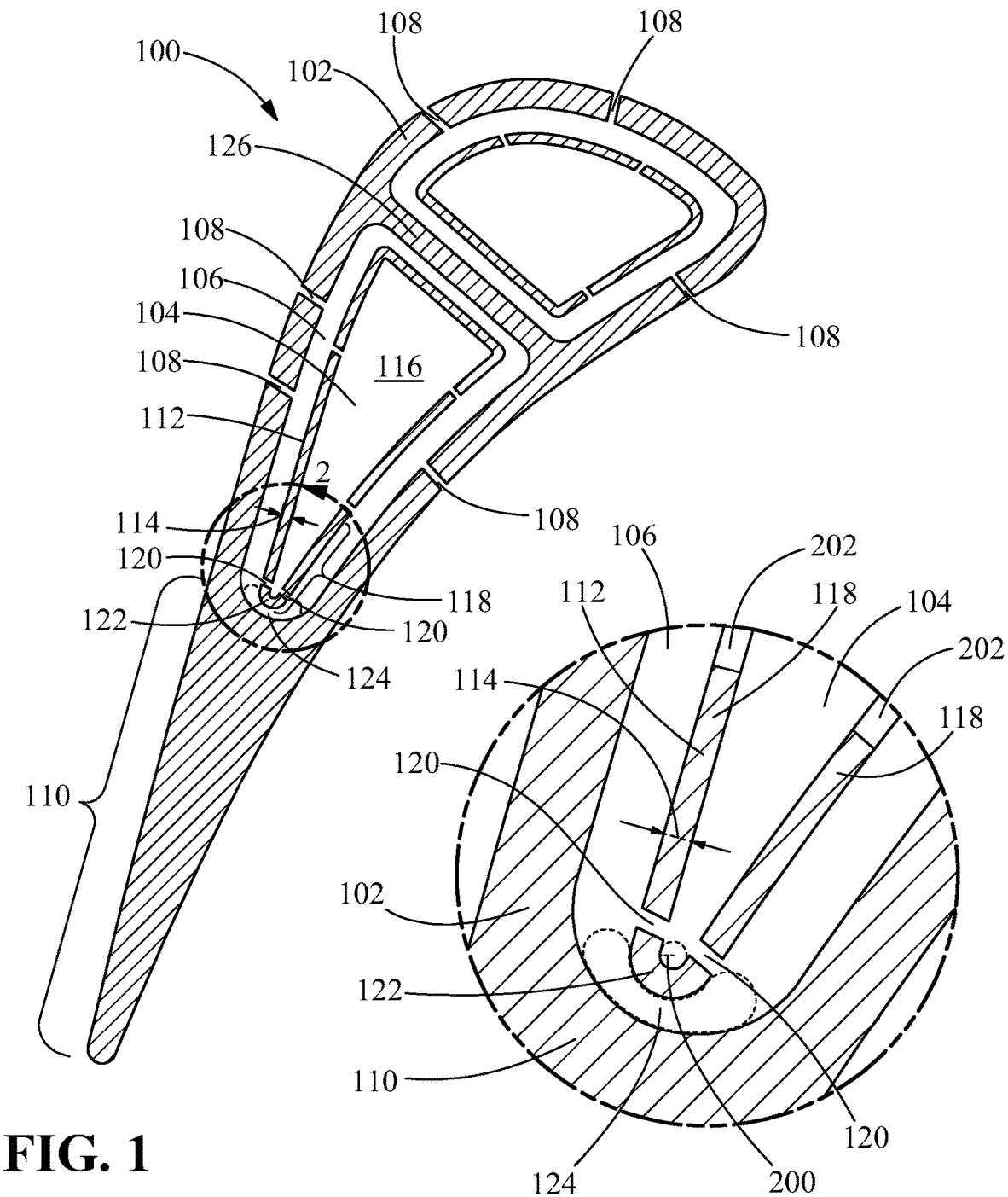
FIG. 1 is a cross-sectional view of a turbine component, according to an embodiment of the present disclosure.
FIG. 2 is an enlarged cross-sectional view taken within area 2 of FIG. 1, according to an embodiment of the present disclosure.

Provided are exemplary turbine components and methods of forming turbine components. Embodiments of the present disclosure, in comparison to articles and methods not utilizing one or more features disclosed herein, increase cooling, increase durability, increase part-life, increase service intervals, increase efficiency, improve manufacturability of complex structures, improved control of impingement jet locations, improved control of impingement jet-to-target gap, improved impingement jet targeting, or a combination thereof.

Referring to FIGS. 1-4, in one embodiment, a turbine component 100 includes a component wall 102, a manifold 104 disposed within the component wall 102, and a post-impingement cavity 106 disposed between the manifold 104 and the component wall 102. The component wall 102 includes a plurality of external apertures 108 and defines a constrained portion 110. As used herein, "constrained portion" 110 refers to a portion of the turbine component 100 across the post-impingement cavity 106 from the manifold 104 in a direction in which the turbine component 100 narrows, wherein "narrows" is construed to include a narrowing of the general conformation of the turbine component 100 as well as a localized narrowing in which the component wall 102 defines an angle. The manifold 104 includes an impingement wall 112, and the impingement wall 112 includes a wall thickness 114 and defines a plenum 116 and a tapered portion 118. The tapered portion 118 tapers toward the constrained portion 110 and includes a plurality of impingement apertures 120 and a wall inflection 122. The wall inflection 122 is disposed proximal to the constrained portion 110. The post-impingement cavity 106 is arranged to receive a fluid from the plenum 116 through the plurality of impingement apertures 120 and exhaust the fluid through the plurality of external apertures 108, and includes an enervated zone 124 disposed between the tapered portion 118 and the constrained portion 110. The tapered portion 118 is integrally formed as a single, continuous object, and the wall inflection 122 includes an inflection radius 200 measured on the inside of the wall inflection 122 of less than about 3 times the wall thickness 114 of the impingement wall 112 at the wall inflection 122.

As used herein, "continuous" indicates that a referenced object or portion does not include an internal welded joint, an internal brazed joint, an internal adhered joint, or a combination thereof. However, this definition does not preclude the continuous object or portion from being attached to another object or portion by an external welded joint, an external brazed joint, an external adhered joint, or a combination thereof.

As used herein, "inflection radius" 200 is similar to the more common term of art "bend radius", except that while the inflection radius 200 describes the radius of a bend in the impingement wall 112, "inflection" is used in lieu of "bend" to ensure that there is no suggestion that the impingement wall 112 was bent into shape rather than being formed with the bend, or inflection, being essentially present as formed.

In a further embodiment, the inflection radius 200 is less than about 1.5 times the wall thickness 114 of the impingement wall 112 at the wall inflection 122, alternatively less than about the wall thickness 114 of the impingement wall 112 at the wall inflection 122, alternatively less than about one-half the wall thickness 114 of the impingement wall 112 at the wall inflection 122. In another embodiment, the inflection radius is less than about 0.12 inches, alternatively less than about 0.06 inches, alternatively less than about 0.03 inches.

In one embodiment, the tapered portion 118 of the manifold 104 includes a portion of the plurality of impingement apertures 120 within a distance of less than about 25 times the wall thickness 114 from the constrained portion 110, alternatively less than about 20 times the wall thickness 114 from the constrained portion 110, alternatively less than about 15 times the wall thickness 114 from the constrained portion 110, alternatively less than about 10 times the wall thickness 114 from the constrained portion 110, alternatively less than about 5 times the wall thickness 114 from the constrained portion 110. In another embodiment, the tapered portion 118 of the manifold 104 includes a portion of the plurality of impingement apertures 120 within about 0.75 inches from the constrained portion 110, alternatively within about 0.5 inches from the constrained portion 110, alternatively within about 0.35 inches from the constrained portion 110, alternatively within about 0.25 inches from the constrained portion 110, alternatively within about 0.15 inches from the constrained portion 110.

Figures 3, 4:
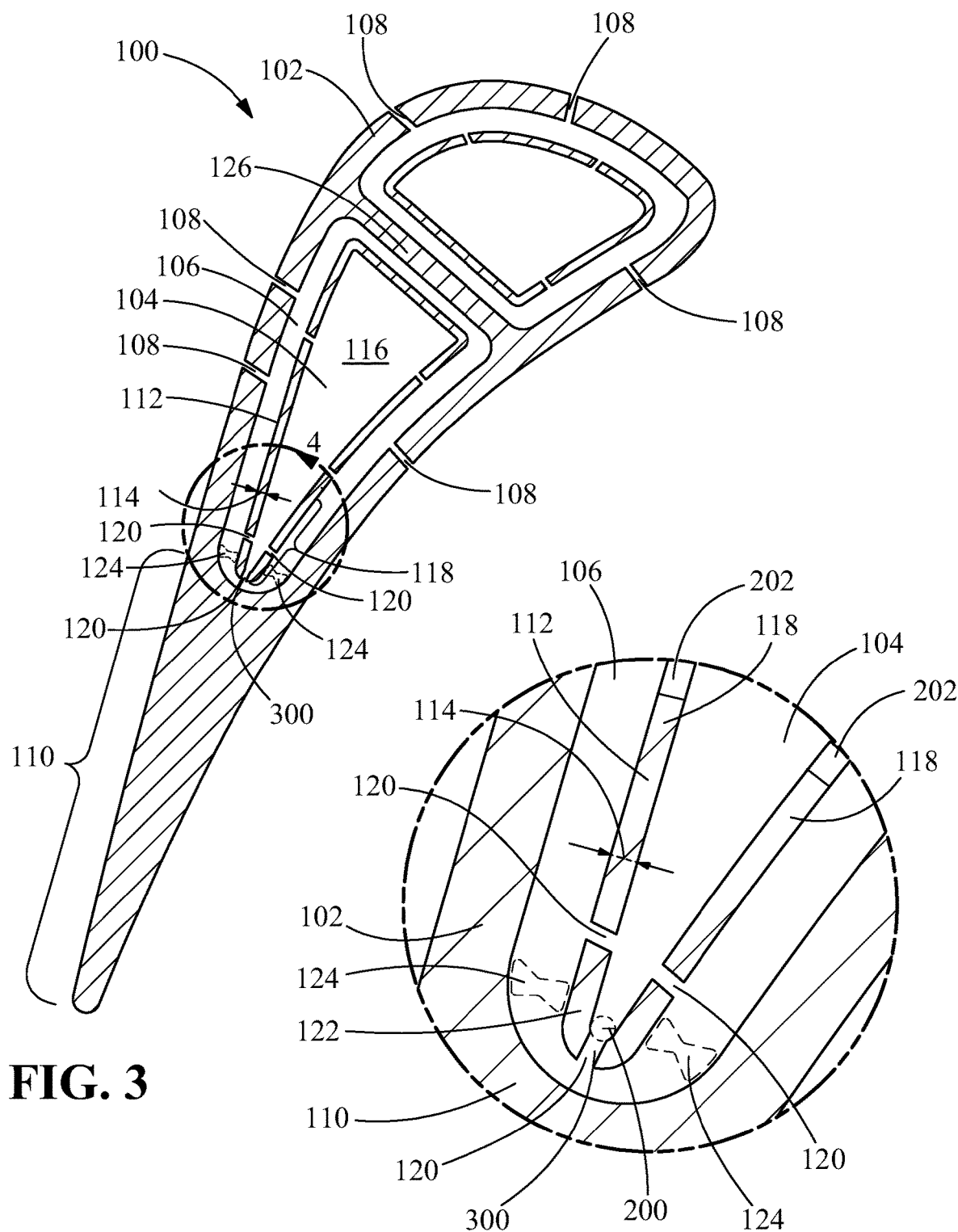
FIG. 3 is a cross-sectional view of a turbine component, according to an embodiment of the present disclosure.
FIG. 4 is an enlarged cross-sectional view taken within area 4 of FIG. 3, according to another embodiment of the present disclosure.

Referring to FIGS. 1-4, the plurality of impingement apertures 120 may have any suitable distribution in the tapered portion 118. Referring to FIGS. 1 and 2, in one embodiment, the plurality of impingement apertures 120 are disposed laterally along the impingement wall 112 in the tapered portion 118. Referring to FIGS. 3 and 4, in another embodiment, the plurality of impingement apertures 120 include at least one inflection aperture 300 disposed at the wall inflection 122. The plurality of apertures 120 may include laterally disposed apertures 120 in the impingement wall 112 of the tapered portion 118 in addition to the at least one inflection aperture 300.

Figures 5, 6:
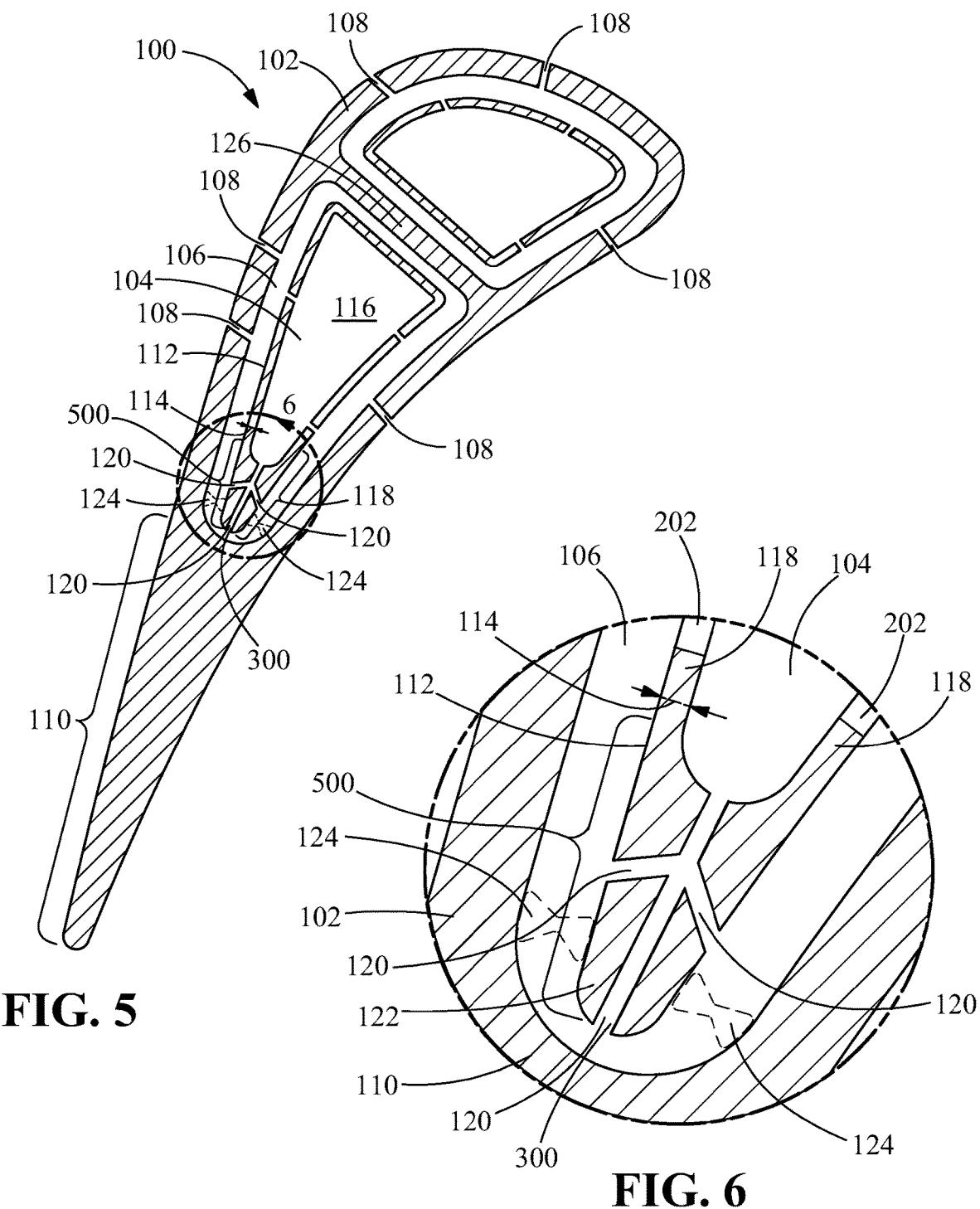
FIG. 5 is a cross-sectional view of a turbine component, according to an embodiment of the present disclosure.
FIG. 6 is an enlarged cross-sectional view taken within area 6 of FIG. 5, according to another embodiment of the present disclosure.

Referring to FIGS. 5 and 6, in one embodiment, a turbine component 100 includes a component wall 102, a manifold 104 disposed within the component wall 102, and a post-impingement cavity 106 disposed between the manifold 104 and the component wall 102. The component wall 102 includes a plurality of external apertures 108 and defines a constrained portion 110. The manifold 104 includes an impingement wall 112, and the impingement wall 112 includes a wall thickness 114 and defines a plenum 116 and a tapered portion 118. The tapered portion 118 tapers toward the constrained portion 110 and includes a wall inflection 122 disposed proximal to the constrained portion 110. The tapered portion 118 further includes a consolidated portion 500 in which the impingement wall 112 extends across the plenum 116 between the plenum 116 and the wall inflection 122. The consolidated portion 500 includes a plurality of impingement apertures 120. The post-impingement cavity 106 is arranged to receive a fluid from the plenum 116 through the plurality of impingement apertures 120 and exhaust the fluid through the plurality of external apertures 108. The post-impingement cavity 106 includes an enervated zone 124 disposed between the tapered portion 118 and the constrained portion 110. The tapered portion 118 is integrally formed as a single, continuous object.

The plurality of impingement apertures 120 of the consolidated portion 500 of the tapered portion 118 may have any suitable distribution in the consolidated portion 500. The plurality of impingement apertures 120 may be disposed laterally along the consolidated portion 500, may include at least one inflection aperture 300 disposed at the wall inflection 122, or both.

Figure 7:
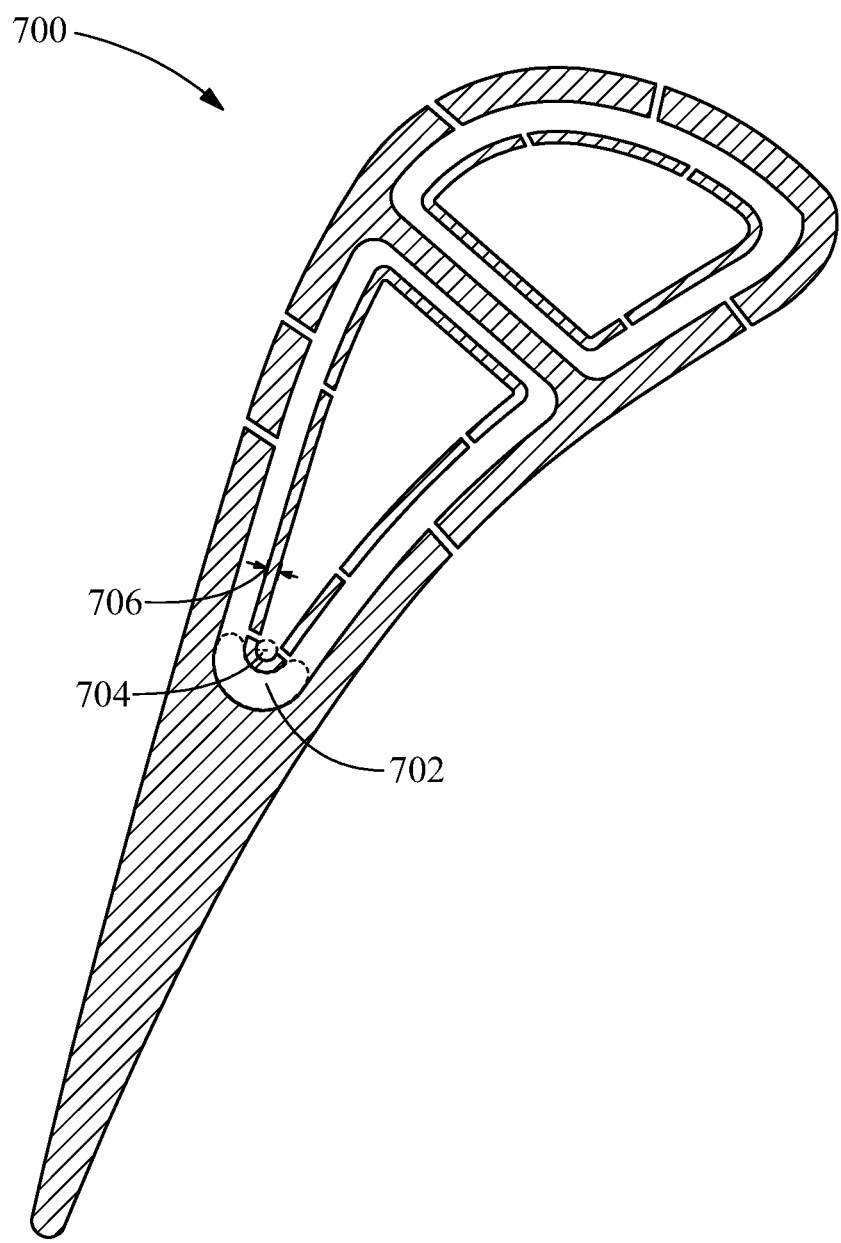
FIG. 7 is a cross-sectional view of a prior art turbine component which is comparable in some respects to the turbine component of FIGS. 1, 3, and 5.

Referring to FIGS. 1, 3, 5, and 7, in one embodiment the enervated zone 124 is reduced relative to a comparable enervated zone 702 of a comparable turbine component 700 lacking at least one of the features described herein, such as having a distinct inflection radius 704 which is not less than about 3 times of a comparable wall thickness 706, or not having an inflection aperture 300, or both. As used herein, the "enervated zone" 124 describes a volume within the post-impingement cavity 106 between the tapered portion 118 and the constrained portion 110 which receives a reduced flow of a cooling fluid during operation in comparison to the rest of the post-impingement cavity 106 due to a lack of impingement apertures 120 in the vicinity of the enervated zone 124. Further, as used with respect to the embodiments disclosed herein, the "enervated zone" 124 is to be construed so as to encompass an enervated zone 124 which is so reduced so as to be essentially eliminated. Therefore references to the enervated zone 124 include instances wherein the enervated zone 124 has been reduced so effectively as to be undetectable and essentially eliminated. Despite the potential elimination of the enervated zone 124 within some of or all of the embodiments disclosed herein, reference to this feature is maintained for comparative purpose, particularly with respect to the comparable enervated zone 702 as shown in FIG. 7.

Referring to FIGS. 1-6, the turbine component 100 may be any suitable component, including, but not limited to, an airfoil, a nozzle (vane), or a bucket (blade). In one embodiment, the turbine component 100 is an airfoil and the constrained portion 110 is a trailing edge of the airfoil. In another embodiment (not shown), the turbine component 100 is an airfoil and the constrained portion 120 is a leading edge of the airfoil. In yet another embodiment (not shown), the turbine component is an airfoil and the constrained portion 120 is adjacent to a support rib 126. The turbine component 100 may include a single tapered portion 118 paired with a single constrained portion 110, or a plurality of tapered portions 118 paired with a plurality of constrained portions 110.

The wall thickness 114 of the tapered portion 118 may be any suitable thickness, including, but not limited to, a thickness of between about 0.01 inches to about 0.05 inches, alternatively, between about 0.02 inches to about 0.036 inches, alternatively between about 0.015 inches to about 0.025 inches, alternatively between about 0.03 inches to about 0.045 inches, alternatively less than about 0.05 inches, alternatively less than about 0.04 inches, alternatively less than about 0.03 inches, alternatively less than about 0.02 inches, alternatively less than about 0.01 inches.

The impingement wall 112 may include any suitable material composition, including, but not limited to, metals, plastics, ceramic matrix composites, or a combination thereof. Suitable metals include, but are not limited to, an iron alloy, a steel, a stainless steel, an aluminum alloy, a titanium alloy, an aluminum-titanium alloy, a cobalt-chrome alloy, or a combination thereof. Suitable ceramic matrix composites include, but are not limited to, aluminum oxide-fiber-reinforced aluminum oxide (Ox/Ox), carbon-fiber-reinforced carbon (C/C), carbon-fiber-reinforced silicon carbide (C/SiC), silicon-carbide-fiber-reinforced silicon carbide (SiC/SiC), or a combination thereof.

In one embodiment, the tapered portion 118 is formed as a separate, distinct object from a remaining portion 202 of the impingement wall 112, and is joined to the remaining portion 202 of the impingement wall 112.

Referring again to FIGS. 1-6, in one embodiment, a method for forming a turbine component 100 includes integrally forming a single, continuous tapered portion 118 of an impingement wall 112 by an additive manufacturing technique, incorporating the impingement wall 112 into a manifold 104, and disposing the impingement wall 112 within a component wall 102. Disposing the impingement wall 112 within the component wall 102 defines a post-impingement cavity 106 between the manifold 104 and the component wall 102.

Integrally forming the single, continuous tapered portion 118 by the additive manufacturing technique may include any suitable manufacturing technique, including, but not limited to direct metal laser melting, direct metal laser sintering, selective laser melting, selective laser sintering, electron beam melting, laser metal deposition, or combinations thereof.

In one embodiment, integrally forming the single, continuous tapered portion 118 of the impingement wall 112 and incorporating the impingement wall 112 into the manifold 104 includes integrally forming the single, continuous tapered portion 118, the impingement wall 112 and the manifold 104 as a single, continuous object by the additive manufacturing technique. In a further embodiment, the component wall 102, the single, continuous tapered portion 118, the impingement wall 112, and the manifold 104 are integrally formed as a single, continuous object by the additive manufacturing technique.

Referring to FIGS. 1-4, in one embodiment, forming the single, continuous tapered portion 118 includes forming the wall inflection 122 having an inflection radius 200 measured on the inside of the wall inflection 122 of less than about 3 times the wall thickness 114 of the impingement wall 112 at the wall inflection 122.

Referring to FIGS. 5 and 6, in another embodiment, forming the single, continuous tapered portion 118 includes forming the tapered portion 118 having a consolidated portion 500 in which the impingement wall 112 extends across the plenum 116 between the plenum 116 and the wall inflection 122, and the plurality of impingement apertures 120 are disposed in the consolidated portion 500.

In another embodiment, the single, continuous tapered portion 118 of the impingement wall 112 is formed as a separate, distinct object from a remaining portion 202 of the impingement wall 112 and the single, continuous tapered portion 118 of the impingement wall 112 is joined to the remaining portion 202 of the impingement wall 112. The single, continuous tapered portion 118 of the impingement wall 112 may be joined to the remaining portion 202 of the impingement wall 112 by any suitable joining technique, including, but not limited to, gas tungsten arc welding, shielded metal arc welding, plasma arc welding, laser beam welding, electron beam welding, resistance welding, friction welding, friction spot welding, friction stir welding, brazing, or a combination thereof.

Referring to FIGS. 1-6, the apertures of the turbine component 100, including the external apertures 108, the impingement apertures 120, and the inflection apertures 300, may be formed by any suitable technique. Suitable techniques may include, but are not limited to, post-fabrication drilling, laser drilling, electrical discharge machining drilling, mechanical drilling, vibrational drilling, milling, computer numerical control milling, water jet cutting, abrasive jet cutting, punching, formation by an additive manufacturing technique, or a combination thereof. Forming an aperture by an additive manufacturing technique may include forming the surrounding structure with the aperture formed by omission of the surrounding structure. In one embodiment, an external aperture 108 is formed by forming the component wall 102 by an additive manufacturing technique, and omitting material to form the external aperture 108 during the formation of the component wall 102 or by forming a sacrificial portion which is readily removed to form the external aperture 108. In another embodiment, an impingement aperture 120 is formed by forming the tapered portion 118 by an additive manufacturing technique, and omitting material to form the impingement aperture 120 during the formation of the tapered portion 118 or by forming a sacrificial portion which is readily removed to form the impingement aperture 120. In yet another embodiment, an inflection aperture 300 is formed by forming the tapered portion 118 by an additive manufacturing technique, and omitting material to form the inflection aperture 300 during the formation of the tapered portion 118 or by forming a sacrificial portion which is readily removed to form the inflection aperture 300.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine component, comprising:
   a component wall including a plurality of external apertures and defining a constrained portion;
   a manifold disposed within the component wall, the manifold including an impingement wall, the impingement wall including a wall thickness and defining a plenum and a tapered portion, the tapered portion tapering toward the constrained portion and including a plurality of impingement apertures and a wall inflection, the wall inflection being disposed proximal to the constrained portion; and
   a post-impingement cavity disposed between the manifold and the component wall, the post-impingement cavity arranged to receive a fluid from the plenum through the plurality of impingement apertures and exhaust the fluid through the plurality of external apertures, the post-impingement cavity including an enervated zone disposed between the tapered portion and the constrained portion,
   wherein the tapered portion is integrally formed as a single, continuous object, and the wall inflection includes an inflection radius measured on the inside of the wall inflection of less than 3 times the wall thickness of the impingement wall at the wall inflection.

2. The turbine component of claim 1, wherein the inflection radius is less than 1.5 times the wall thickness of the impingement wall at the wall inflection.

3. The turbine component of claim 1, wherein the inflection radius is less than 0.06 inches.

4. The turbine component of claim 1, wherein the turbine component is an airfoil and the constrained portion is a trailing edge of the airfoil.

5. The turbine component of claim 1, wherein the tapered portion of the manifold includes a portion of the plurality of impingement apertures within a distance of less than 20 times the wall thickness from the constrained portion.

6. The turbine component of claim 1, wherein the tapered portion of the manifold includes a portion of the plurality of impingement apertures within 0.5 inches from the constrained portion.

7. The turbine component of claim 1, wherein the wall thickness of the tapered portion is 0.02 inches to 0.036 inches.

8. The turbine component of claim 1, wherein the enervated zone is reduced relative to a comparative enervated zone of an otherwise identical comparative turbine component having a comparative inflection radius which is not less than 3 times of a comparative wall thickness of the otherwise identical comparative turbine component.

9. The turbine component of claim 1, wherein the impingement wall includes a stainless steel composition.

10. A turbine component, comprising:
    a component wall including a plurality of external apertures and defining a constrained portion;
    a manifold disposed within the component wall, the manifold including an impingement wall, the impingement wall including a wall thickness and defining a plenum and a tapered portion, the tapered portion tapering toward the constrained portion and including a wall inflection disposed proximal to the constrained portion, the tapered portion further including a consolidated portion in which the impingement wall extends across the plenum between the plenum and the wall inflection such that the consolidated portion includes an effective wall thickness greater than the wall thickness of the impingement wall outside of the consolidated portion, the consolidated portion including a plurality of impingement apertures; and
    a post-impingement cavity disposed between the manifold and the component wall, the post-impingement cavity arranged to receive a fluid from the plenum through the plurality of impingement apertures and exhaust the fluid through the plurality of external apertures, the post-impingement cavity including an enervated zone disposed between the tapered portion and the constrained portion,
    wherein the tapered portion is integrally formed as a single, continuous object, and
    wherein the wall thickness and the effective wall thickness are measured from an interior surface of the impingement wall to an exterior surface of the impingement wall in a direction normal to the interior surface of the impingement wall.

11. The turbine component of claim 10, wherein the plurality of impingement apertures includes at least one inflection aperture disposed at the wall inflection.

12. The turbine component of claim 11, wherein the enervated zone is reduced relative to a comparative enervated zone of an otherwise identical comparative turbine component lacking the at least one inflection aperture disposed at the wall inflection.

13. The turbine component of claim 10, wherein the turbine component is an airfoil and the constrained portion is a trailing edge of the airfoil.

14. A method for forming a turbine component, comprising:
integrally forming a single, continuous tapered portion of an impingement wall by an additive manufacturing technique and incorporating the impingement wall into a manifold, the impingement wall including a wall thickness and defining a plenum, the tapered portion tapering to a wall inflection and including a plurality of impingement apertures; and
disposing the impingement wall within a component wall, the component wall including a plurality of external apertures and defining a constrained portion, the wall inflection being disposed proximal to the constrained portion,
wherein disposing the impingement wall within the component wall defines a post-impingement cavity between the manifold and the component wall, the post-impingement cavity being arranged to receive a fluid from the plenum through the plurality of impingement apertures and exhaust the fluid through the plurality of external apertures, the post-impingement cavity including an enervated zone disposed between the tapered portion and the constrained portion, and
wherein:
forming the single, continuous tapered portion includes forming the wall inflection having an inflection radius measured on the inside of the wall inflection of less than 3 times the wall thickness of the impingement wall at the wall inflection; or
forming the single, continuous tapered portion includes forming the tapered portion having a consolidated portion in which the impingement wall extends across the plenum between the plenum and the wall inflection such that the consolidated portion includes an effective wall thickness greater than the wall thickness of the impingement wall outside of the consolidated portion, the wall thickness and the effective wall thickness being measured from an interior surface of the impingement wall to an exterior surface of the impingement wall in a direction normal to the interior surface of the impingement wall, and the plurality of impingement apertures being disposed in the consolidated portion.

15. The method of claim 14, wherein forming the single, continuous tapered portion includes forming the wall inflection having the inflection radius measured on the inside of the wall inflection of less than 1.5 times the wall thickness of the impingement wall at the wall inflection.

16. The method of claim 14, wherein forming the single, continuous tapered portion includes forming the tapered portion having the consolidated portion in which the impingement wall extends across the plenum between the plenum and the wall inflection, the plurality of impingement apertures being disposed in the consolidated portion.

17. The method of claim 14, wherein integrally forming the single, continuous tapered portion by the additive manufacturing technique includes the additive manufacturing technique being selected from the group consisting of direct metal laser melting, direct metal laser sintering, selective laser melting, selective laser sintering, electron beam melting, laser metal deposition, and combinations thereof.

18. The method of claim 14, wherein integrally forming the single, continuous tapered portion of the impingement wall and incorporating the impingement wall into the manifold includes integrally forming the single, continuous tapered portion, the impingement wall and the manifold as a single, continuous object by the additive manufacturing technique.

19. The method of claim 18, wherein disposing the impingement wall within the component wall includes integrally forming the component wall, the single, continuous tapered portion, the impingement wall, and the manifold as a single, continuous object by the additive manufacturing technique.

20. The method of claim 14, wherein forming the single, continuous tapered portion of the impingement wall and incorporating the impingement wall into the manifold includes forming the single, continuous tapered portion of the impingement wall as a separate, distinct object from a remaining portion of the impingement wall and joining the single, continuous tapered portion of the impingement wall to the remaining portion of the impingement wall.

* * * * *